United States Patent
Butera et al.

(10) Patent No.: US 7,000,639 B2
(45) Date of Patent: Feb. 21, 2006

(54) AIR-DISTRIBUTION DEVICE BASED ON THE COANDA EFFECT WITH MEANS FOR IMPARTING A CIRCULATORY MOTION ON THE FLOW OF AIR NOT PROPERLY ORIENTED

(75) Inventors: Francesco Butera, Turin (IT); Marco Biasiotto, Turin (IT); Stefano Alacqua, Rivoli Cascine Vica (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/010,285

(22) Filed: Dec. 14, 2004

(65) Prior Publication Data

US 2005/0130579 A1 Jun. 16, 2005

(30) Foreign Application Priority Data

Dec. 16, 2003 (IT) .......................... TO2003A1009

(51) Int. Cl.
*F15C 1/08* (2006.01)
(52) U.S. Cl. ...................... 137/829; 137/831; 454/121
(58) Field of Classification Search ................ 454/121, 454/156, 159–161; 165/42, 43, 204; 137/829, 137/831
See application file for complete search history.

(56) References Cited

U.S. PATENT DOCUMENTS

| | | | | |
|---|---|---|---|---|
| 4,073,316 A | * | 2/1978 | Nystrom | 137/829 |
| 5,067,509 A | * | 11/1991 | Hunter | 137/14 |
| 6,582,294 B1 | * | 6/2003 | Butera et al. | 454/155 |
| 6,792,976 B1 | * | 9/2004 | Butera et al. | 137/831 |
| 6,887,148 B1 | * | 5/2005 | Biasiotto et al. | 454/121 |
| 2003/0157877 A1 | | 8/2003 | Butera et al. | |
| 2003/0168114 A1 | | 9/2003 | Butera et al. | |

FOREIGN PATENT DOCUMENTS

| | | |
|---|---|---|
| EP | 1 249 670 A2 | 10/2002 |
| EP | 1 382 472 A1 | 1/2004 |
| WO | WO 03/002362 A1 * | 1/2003 |

* cited by examiner

*Primary Examiner*—Harold Joyce
(74) *Attorney, Agent, or Firm*—Nixon & Vanderhye, PC (57) ABSTRACT

Described herein is a Coanda-effect air distributor for distributing a flow between a number of ducts set downstream. Provided in the area that separates the initial ends of two ducts set downstream is the inlet of a recirculation duct that creates an air circulation that masks the entrance of a duct set downstream when the flow is deviated into the other duct.

3 Claims, 7 Drawing Sheets

ID-DISTRIBUTION DEVICE BASED ON
THE COANDA EFFECT WITH MEANS FOR
IMPARTING A CIRCULATORY MOTION ON
THE FLOW OF AIR NOT PROPERLY
ORIENTED

SUMMARY OF THE INVENTION

The present invention relates to air-distribution devices based upon the Coanda effect, of the type comprising a duct set upstream that branches off into a number of ducts set downstream and means designed to deflect the air flow that traverses said duct into one or the other of said ducts, exploiting the Coanda effect.

The Coanda effect is the phenomenon whereby a flow of air exiting from a duct tends to "stick" to a wall that is adjacent to it. In a device previously proposed by the present applicant, the aforesaid means of deflection by the Coanda effect comprise a first mobile element provided on a wall of the duct, which is set upstream in the proximity of the inlet of one of the ducts set downstream and can be displaced between a first position, in which it does not interfere with the flow of air through the duct set upstream, and a second position, in which it projects into said flow, so that, in the aforesaid first position of the mobile element, the flow enters a first duct set downstream, remaining adherent to a wall of this by the Coanda effect, whilst in the aforesaid second position of the mobile element, the flow that traverses the duct set upstream tends to adhere to a wall of a second duct set downstream that is opposite to said first wall, so that the flow enters the aforesaid second duct set downstream.

The purpose of the present invention is to provide an air-distribution device based upon the Coanda effect of the type indicated above that will be even more efficient than the devices proposed up to now.

In order to achieve said purpose, the subject of the invention is an air-distribution device based upon the Coanda effect of the type described above, characterized in that, in the area that separates the initial ends of two ducts set downstream, there is provided the inlet of a recirculation passage giving out into one of the two ducts set downstream and shaped in such a way as to generate a circulation of air to the inlet of one of the two ducts set downstream, which masks the inlet of said duct when the air flow is deviated into the other duct set downstream.

Preferably, said solution is used in combination with means for deflecting the air by the Coanda effect that comprise two mobile elements, which are positioned on opposite walls of the duct set upstream and are each displaceable between a first position, in which it does not interfere with the flow of the air, and a second position, in which it projects into said flow, said mobile elements being displaceable in synchronism with one another so that when a first mobile element is in its first position, the second mobile element is in its second position and when, conversely, the first mobile element is in its second position, the second mobile element is in its first position.

According to a further preferred characteristic, also one of said mobile elements can be shaped so that, when it is in its second position projecting into a respective duct, it interferes with the possible flow of air not properly oriented so as to impart a circulatory motion upon said flow, which masks one of the ducts set downstream when the air flow is directed into the other duct.

A preferred application of the air-distributing device according to the invention consists of the air-distribution systems built into dashboards of motor vehicles. It is evident, however, that the Coanda-effect air-distributing device according to the invention is of general application.

In what follows the invention will now be described in detail with reference to the application to the dashboard of a motor vehicle.

BRIEF DESCRIPTION OF THE DRAWINGS

In the annexed drawings, which are provided purely by way of non-limiting example.

DETAILED DESCRIPTION OF THE INVENTION

Figure 1:
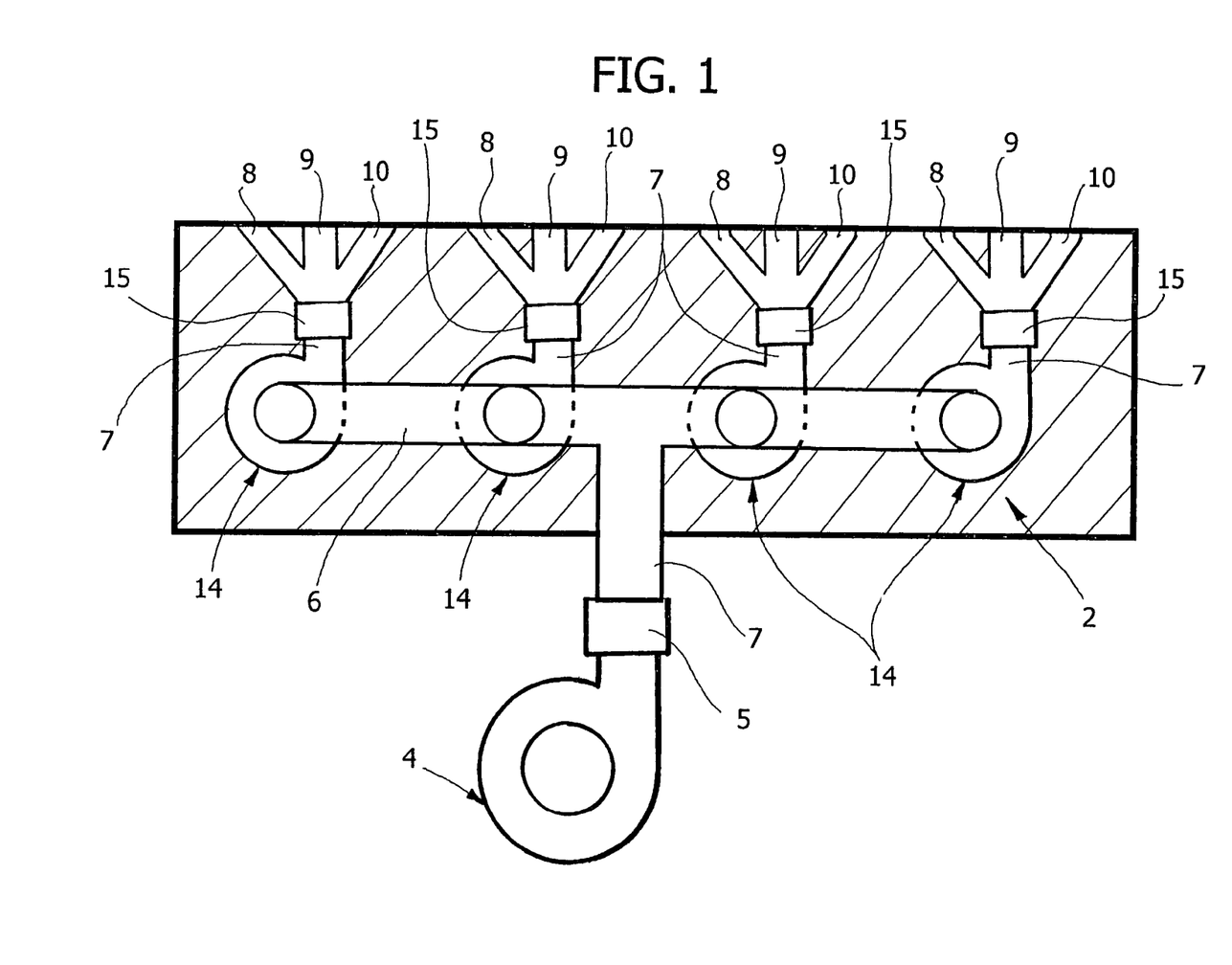
FIG. 1 is a diagram illustrating the principle underlying the air-distribution system according to the invention.
Figure 2:
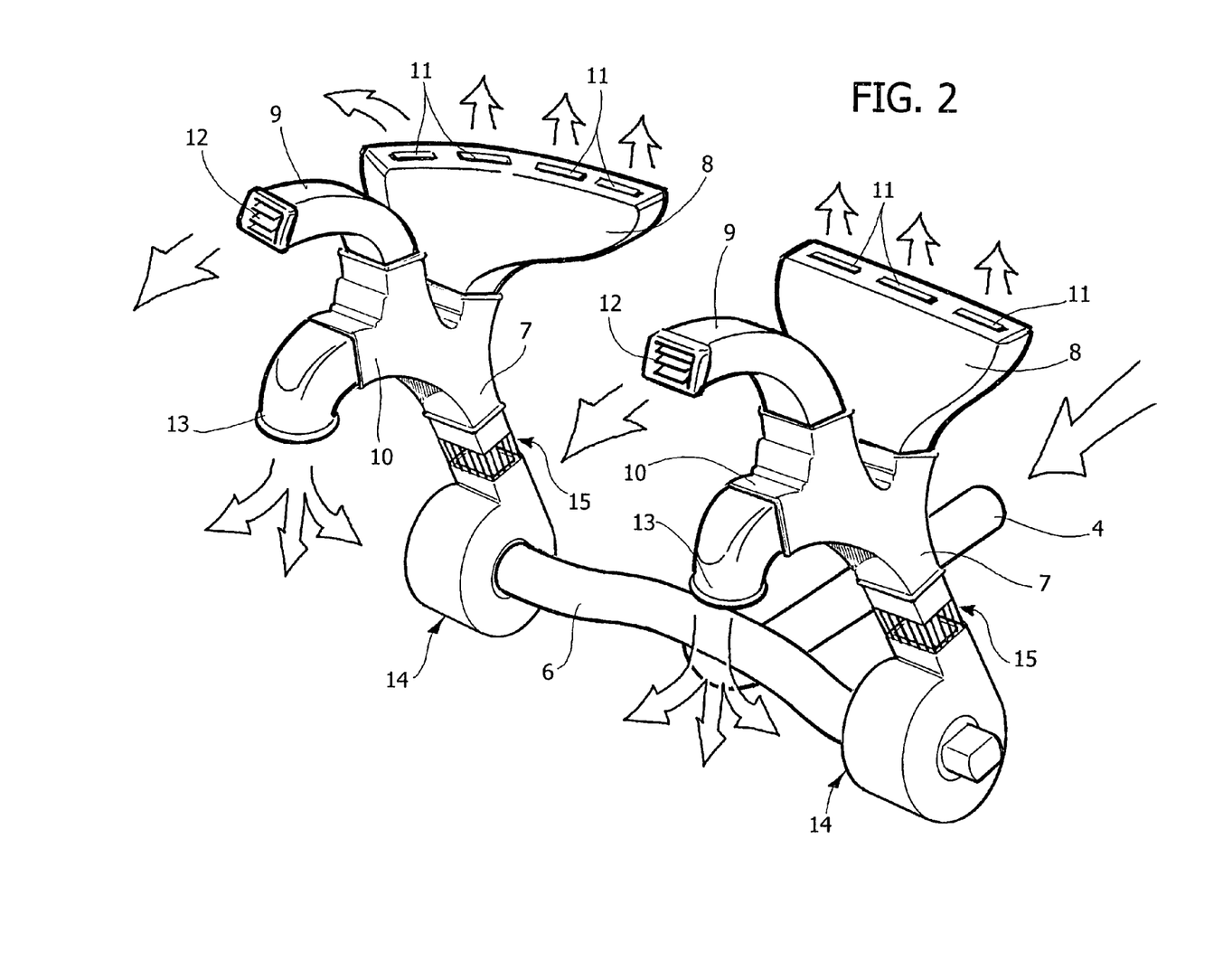
FIG. 2 is a partial schematic perspective view of an air-distribution system for the dashboard of a motor vehicle according to the invention.
Figure 3:
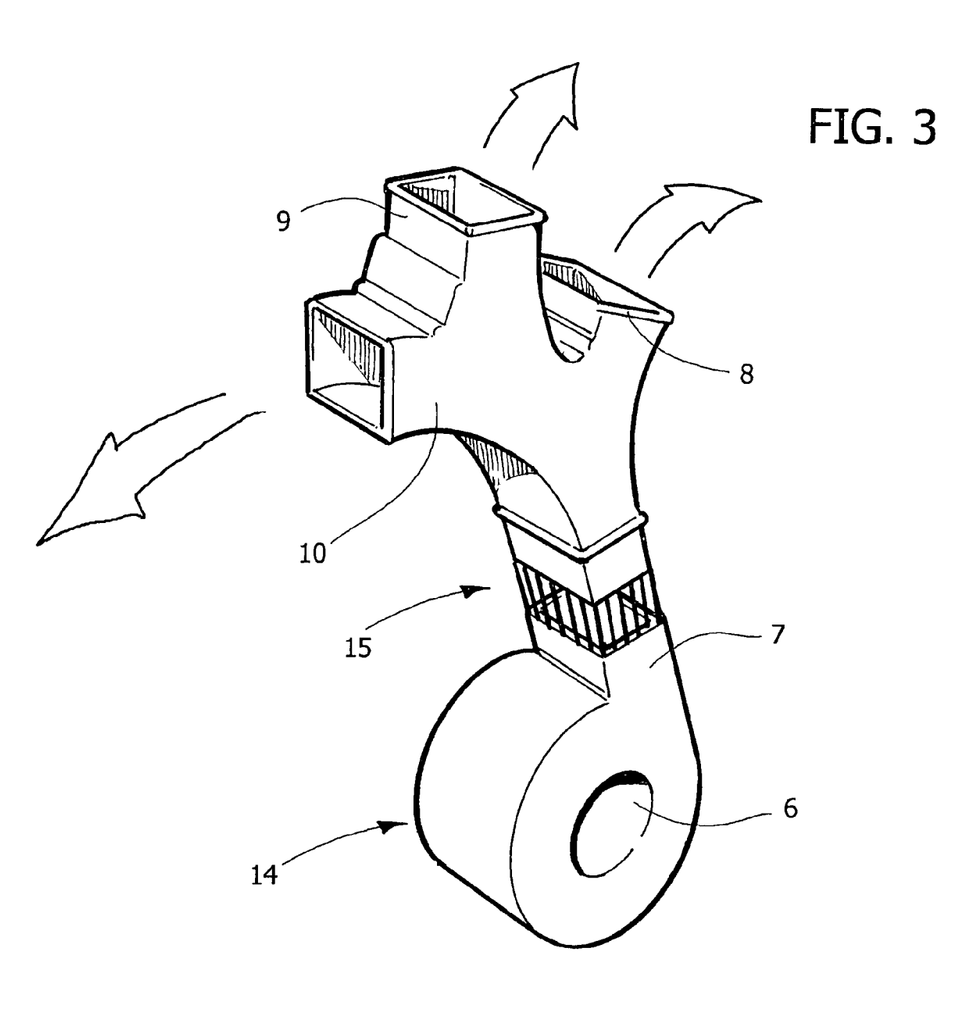
FIG. 3 is a view, at an enlarged scale, of a detail of FIG. 2.

In FIG. 1, the reference number 1 designates as a whole a dashboard, illustrated only schematically, of a motor vehicle, there being provided, inside the dashboard, an air-distribution system 2. The system 2 comprises a main duct 3 that receives air from an air-conditioning system, including a main fan 4 and a heater/evaporator 5. The main duct 3 gives out into a manifold or rail 6, from which there branch off four auxiliary ducts 7, distributed in parallel along the dashboard, one pair on the driver side, and one pair on the passenger side, each pair comprising a duct adjacent to the central part of the dashboard and a duct closer to a side window of the motor vehicle. Each auxiliary duct 7 branches off into three terminal ducts 8, 9, 10 (see also FIG. 2), each of which terminates on air-outflow openings in the passenger compartment of the motor vehicle. In particular, the duct 8 supplies air to openings 11 arranged at the base of the windscreen for directing a flow of air onto the internal surface of the latter. The duct 9 terminates in one or more openings 12 arranged at the front, on the dashboard, for directing air towards the passenger compartment of the motor vehicle, and the duct 10 terminates in one or more openings 13, which direct a flow of air towards the floor of the passenger compartment.

In the area in which each auxiliary duct 7 branches off into the three terminal ducts 8, 9, 10, there are provided means for distributing the flow of air between the terminal ducts, which will be illustrated in detail in what follows.

An important characteristic, which forms the subject of a separate application, lies in the fact that each of the auxiliary ducts 7 is provided with an additional and independent unit for regulating at least one characteristic of the air flow. In particular, associated to each auxiliary duct 7 is, in the example of embodiment illustrated, a unit 14 for regulating the flow rate of the air and a unit 15 for regulating the temperature of the air. In the example illustrated, the unit 14 comprises a fan with corresponding electric controlling motor, whilst the unit 15 comprises a cross section of duct, in which an electrical resistor is inserted.

Therefore, the distribution system illustrated enables regulation of the rate and/or the temperature of the air flow exiting from the openings 11, 12, 13, separately for each of the auxiliary ducts 7, i.e., in the case of the example illustrated, separately for the driver area and for the passenger area and, for each of said areas, separately for the central area of the dashboard and for the area adjacent to the window.

Figure 4:
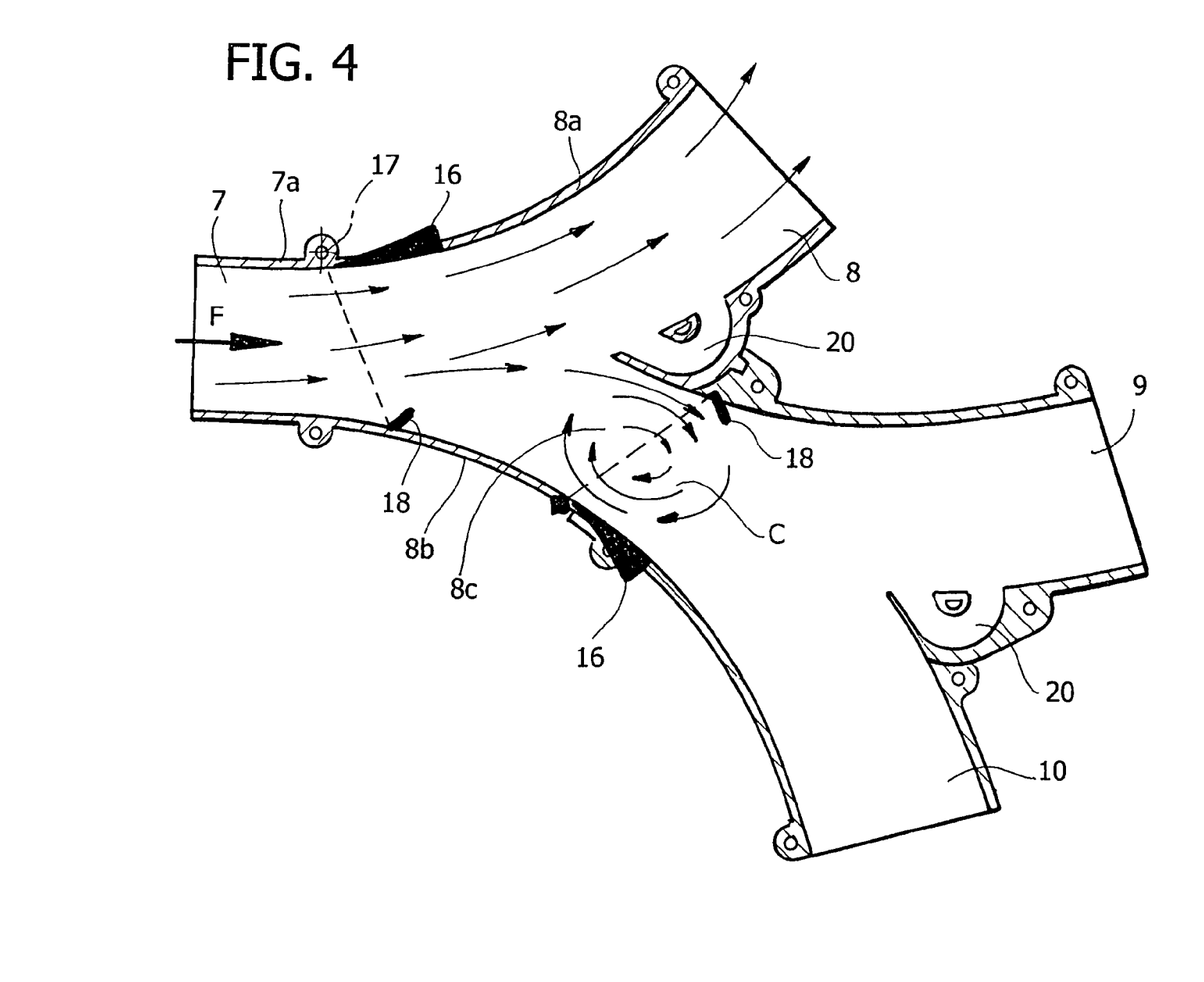
FIGS. 4, 5, and 6 are cross-sectional views, at an enlarged scale, of a detail of FIG. 3, which show the system according to the invention in different conditions of operation.
Figure 5:
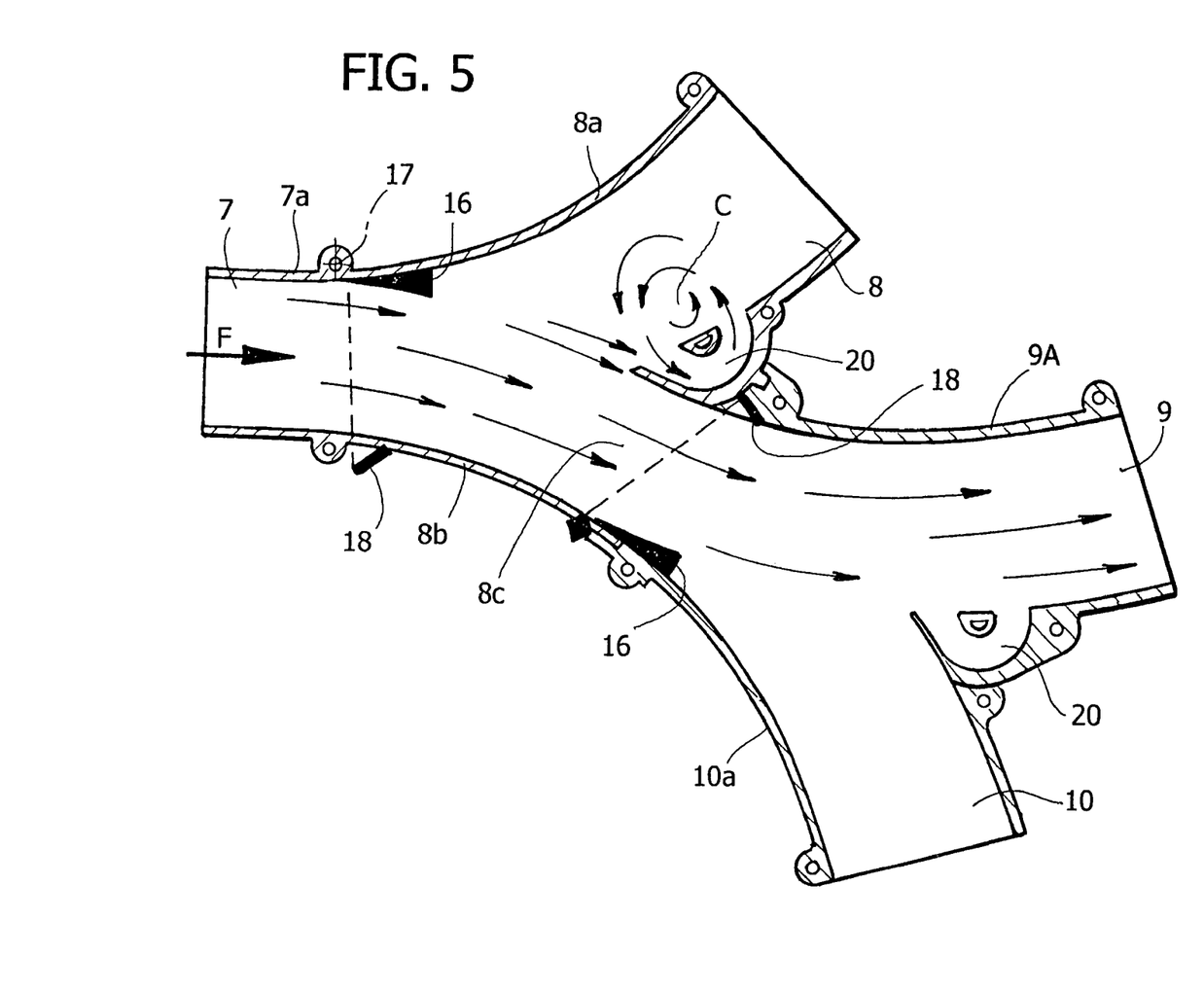
Figure 6:
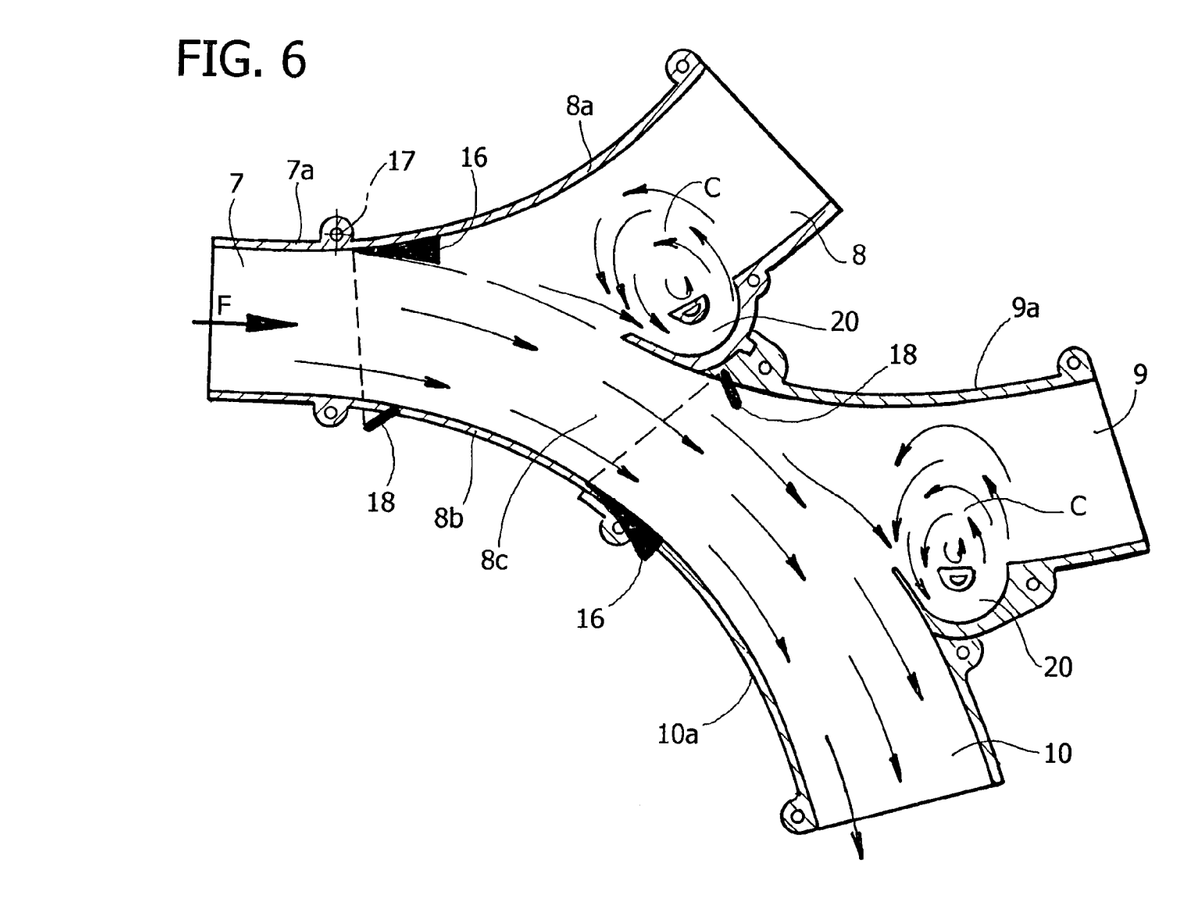

FIGS. 4–6 illustrate the way in which the distribution of the air coming from each auxiliary duct 7 into the terminal ducts 8, 9, 10 that branch off therefrom is controlled.

With reference to said figures, the first terminal duct 8 has a first curved wall 8a set on the prolongation of a corresponding wall 7a of the auxiliary duct 7. In a position corresponding to said wall, associated to the duct is a mobile element 16, which is mounted oscillating about an axis of articulation 17 on the wall 7a and can be displaced between a first position, visible in FIG. 4, and a second position, visible in FIG. 5. In the first position illustrated in FIG. 4, the mobile element 16 does not interfere with the air flow F coming from the auxiliary duct 7, so that said flow remains "stuck" to the walls 7a and 8a and consequently enters the first terminal duct 8. In the second position of the mobile element 16 illustrated in FIG. 5, said mobile element projects into the flow F so that it invites said flow to adhere, by the Coanda effect, to a curved wall 8b opposite to the wall 8a and situated at the inlet of the two terminal ducts 9, 10.

Figure 7:
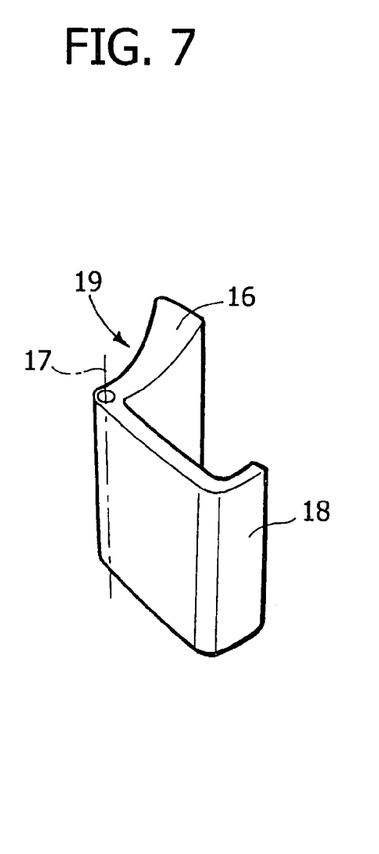
FIG. 7 is a perspective schematic view of a detail of FIGS. 4–6.

To obtain a more efficient distribution of the air flow between the terminal duct 8 and the inlet 8c of the two terminal ducts 9, 10, there is provided a further mobile element 18, which can be displaced between a first position, in which it does not interfere with the flow F (illustrated in FIG. 5), and a second position, in which it projects into the flow F (illustrated in FIG. 4). The two mobile elements 16, 18 must be controlled in synchronism so that when the mobile element 16 is in its first position the mobile element 18 is in its second position (FIG. 4), whereas when the first mobile element 16 is in its second position the second mobile element 18 is in its first position (FIG. 5). In the case of the example illustrated, this is obtained very simply in so far as the mobile element 16 and the mobile element 18 form part of a single member 19 mounted articulated on the structure of the duct 7 about the axis 17. As may be seen in FIG. 7, the member 19 comprises a vaned part that defines the element 16, and a U-shaped part, rigidly connected to the vane 16 and substantially orthogonal thereto, including a bent cross member that constitutes the mobile element 18.

In the condition illustrated in FIG. 4, the mobile element 18 encourages "sticking" of the flow F to the wall 8 in so far as it prevents the flow F from remaining adherent to the wall 8b. In the condition illustrated in FIG. 5, since the element 18 does not disturb the flow F it enables said flow to stick to the wall 8b by the Coanda effect.

As may be seen in FIGS. 4–6, a further mobile member 19, which includes a first mobile element 16 and a second mobile element 18 altogether similar to the ones described above, is moreover provided in a position corresponding to the inlets 8c of the two terminal ducts 9, 10. The mode of operation of said second mobile member is altogether similar to what has been described above. In the condition illustrated in FIG. 5, the second mobile member favours sticking, by the Coanda effect, of the flow to a first curved wall 9a of the terminal duct 9, so that the flow enters said duct, whilst in the condition illustrated in FIG. 6 it favours the sticking of the flow to a wall 10a, which is also curved, of the terminal duct 10, so that the flow enters this latter duct. Furthermore, the mobile element 18 in this case also performs the function of interfering (in the condition illustrated in FIG. 4) with a possible part of the main flow F that were to enter the inlets 8c bestowing thereon a circulatory motion C (FIG. 4) that "obstructs" the inlets 8c, reducing to a minimum any undesired leakages of air in the ducts 9, 10.

For the same purpose, according to the invention, in a position corresponding to the inlets of the terminal duct 8 and of the terminal duct 9 there are provided air-recirculation passages 20 shaped so that, in the conditions illustrated respectively in FIG. 5 and FIG. 6, any possible undesired leakages of air give rise to an air circulation C that obstructs the duct into which the flow is to be directed.

The mobile members 19 are controlled by actuators of any type, for example electromagnetic actuators (such as the actuator 40 in FIG. 8), or piezoelectric actuators, or shape-memory actuators.

Figures 8, 9:
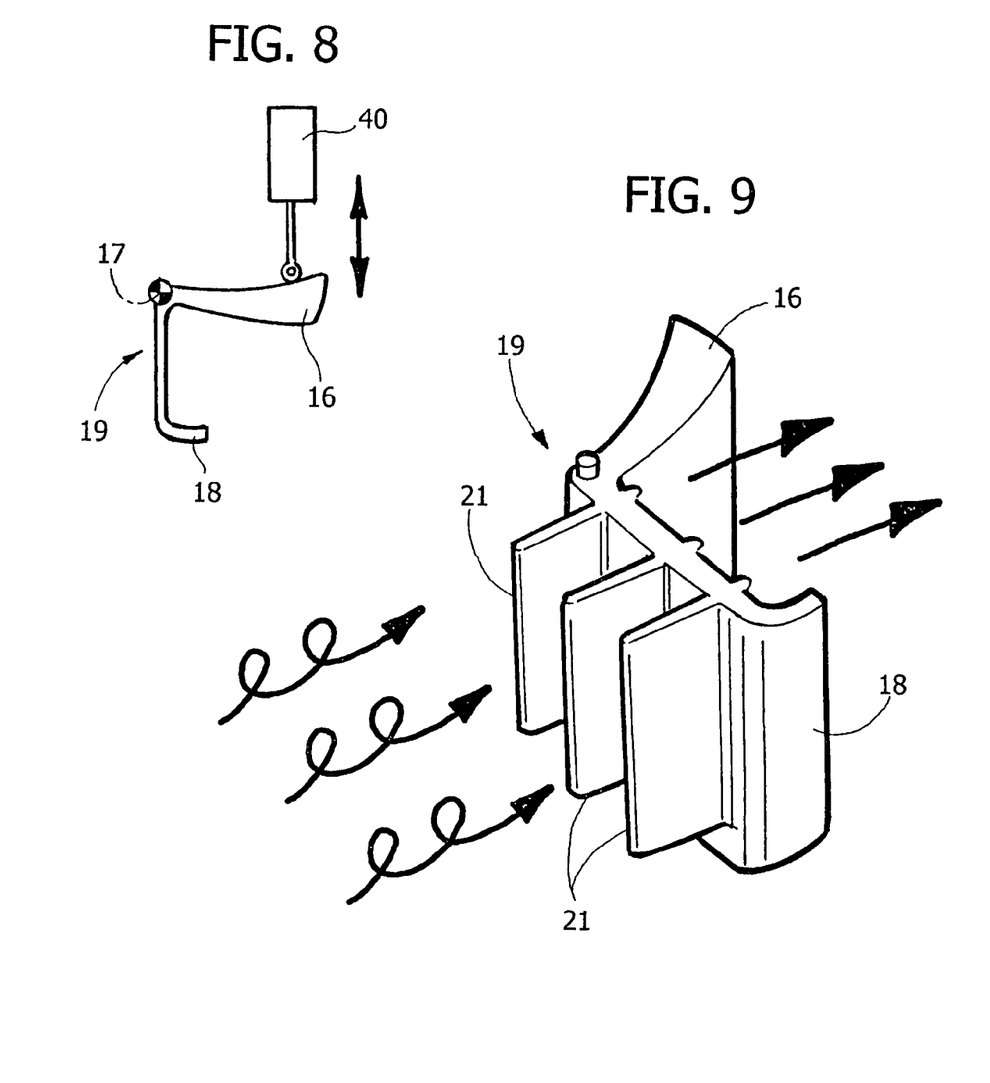
FIG. 8 is a schematic view of the actuator of the item represented in FIG. 7.
FIG. 9 illustrates a variant of FIG. 7.

FIG. 8 illustrates a variant of the member 19, in which the U-shaped portion defining the mobile element 18 also includes vanes 21 having the function of straightening the flow.

Of course, without prejudice to the principle of the invention, the details of construction and the embodiments may vary widely with respect to what is described and illustrated herein purely by way of example, without thereby departing from the scope of the present invention.

What is claimed is:

1. An air-distribution device based upon the Coanda-effect, comprising a duct set upstream, which branches off into a plurality of ducts set downstream and means for deflecting the air flow that traverses the duct set upstream into one or the other of the aforesaid ducts set downstream, exploiting the Coanda effect, said means comprising a first mobile element, which is provided on a wall of the duct set upstream in the proximity of the inlet of a terminal duct and can be displaced between a first position, in which it does not interfere with said air flow and a second position, in which it projects into said flow, so that in the aforesaid first position of said first mobile element the flow enters said first duct set downstream, remaining adherent, by the Coanda effect, to a wall of the latter, whilst in the second position of the mobile element the air flow enters a second duct set downstream, tending to adhere by the Coanda effect to a wall opposite to said first wall, said device being wherein provided in the area that separates the initial ends of two ducts set downstream is the inlet of a recirculation passage, which gives out into one of the two ducts set downstream and is shaped in such a way as to generate an air circulation within one of said ducts that masks the inlet thereof when the air flow is deviated into the other duct set downstream.

2. An air-distribution device based upon the Coanda-effect according to claim 1, wherein the aforesaid means of deviation by the Coanda effect comprise a second mobile element provided on a wall opposite to the one on which there is provided a first mobile element, and wherein said second mobile element can also be displaced between a first position, in which it does not interfere with the air flow, and a second position, in which it projects into said air flow, and wherein said first mobile element and said second mobile element are displaceable in synchronism with one another so that when the first mobile element is in its first position, the second mobile element is in its second position and when the first mobile element is in its second position, the second mobile element is in its first position.

3. The air-distribution device according to claim 1, wherein said second mobile element is arranged so that when it is in its second position it imparts a circulatory motion on the flow of air that impinges upon it, which masks the inlet of the respective duct to the air flow when this is deviated into another duct.

* * * * *